United States Patent
Naserian et al.

(10) Patent No.: US 10,112,595 B2
(45) Date of Patent: Oct. 30, 2018

(54) PREDICTIVE CONTROL OF POWERTRAIN SYSTEMS BASED ON VEHICLE-TO-VEHICLE (V2V) COMMUNICATIONS

(71) Applicants: Hyundai America Technical Center, Inc, Superior Township, MI (US); Hyundai Motor Company, Seoul (KR); Kia Motors Corporation, Seoul (KR)

(72) Inventors: Mohammad Naserian, Windsor (CA); Allan Lewis, Windsor (CA)

(73) Assignees: Hyundai America Technical Center, Inc, Superior Township, MI (US); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 46 days.

(21) Appl. No.: 15/345,771

(22) Filed: Nov. 8, 2016

(65) Prior Publication Data

US 2018/0126976 A1    May 10, 2018

(51) Int. Cl.
*B60W 20/12*    (2016.01)
*B60W 10/04*    (2006.01)
*G08G 1/16*    (2006.01)

(52) U.S. Cl.
CPC ............ *B60W 20/12* (2016.01); *B60W 10/04* (2013.01); *G08G 1/161* (2013.01); *B60W 2550/408* (2013.01)

(58) Field of Classification Search
CPC ................ B60W 20/12; B60W 10/04; B60W 2550/408; G08G 1/161

USPC ............................................................ 701/2
See application file for complete search history.

(56) References Cited

U.S. PATENT DOCUMENTS

| | | | |
|---|---|---|---|
| 2007/0043539 A1* | 2/2007 | Niina | G05B 23/0221 702/188 |
| 2010/0245171 A1* | 9/2010 | Zeng | G01S 5/0072 342/357.34 |
| 2012/0089299 A1* | 4/2012 | Breed | B60C 11/24 701/36 |

(Continued)

FOREIGN PATENT DOCUMENTS

| CA | 2 779 587 A1 | 2/2013 |
|---|---|---|
| JP | 5102101 B2 | 12/2012 |

(Continued)

OTHER PUBLICATIONS

"Energy Management Strategy for Plug-in Hybrid Electric Vehicles", NREL/CP-540-40970, Apr. 16-19, 2007.

*Primary Examiner* — Yazan A Soofi
(74) *Attorney, Agent, or Firm* — Mintz Levin Cohn Ferris Glovsky and Popeo, P.C.; Peter F. Corless

(57) ABSTRACT

A method includes: receiving, at a host vehicle, Vehicle-to-Vehicle (V2V) messages transmitted using V2V communication from one or more remote vehicles; identifying at least one vehicle of the one or more remote vehicles that is ahead of the host vehicle based on information included in the received V2V messages; selecting V2V messages among the received V2V messages that were received from the at least one identified vehicle; and controlling a powertrain system of the host vehicle based on information included in the selected V2V messages.

24 Claims, 10 Drawing Sheets

(56) References Cited

U.S. PATENT DOCUMENTS

| | | | |
|---|---|---|---|
| 2012/0221234 A1* | 8/2012 | Sujan | G06Q 10/04 701/123 |
| 2013/0278443 A1* | 10/2013 | Rubin | G08G 9/02 340/905 |
| 2015/0224845 A1* | 8/2015 | Anderson | B60G 17/019 701/37 |
| 2016/0231746 A1* | 8/2016 | Hazelton | G05D 1/0212 |
| 2016/0321924 A1* | 11/2016 | Lewis | G08G 1/096791 |
| 2016/0335897 A1* | 11/2016 | Naserian | G08G 1/161 |
| 2017/0080919 A1* | 3/2017 | Follen | B60W 20/12 |
| 2017/0182859 A1* | 6/2017 | Anderson | B60G 17/052 |
| 2017/0249844 A1* | 8/2017 | Perkins | B60W 50/0097 |
| 2017/0344023 A1* | 11/2017 | Laubinger | G05D 1/0272 |

FOREIGN PATENT DOCUMENTS

| | | |
|---|---|---|
| JP | 2013-082382 A | 5/2013 |
| KR | 10-1114415 | 2/2012 |
| WO | 2011098414 A1 | 8/2011 |

* cited by examiner

| BSM Part 1 |
|---|
| Message sequence number |
| Vehicle Temp ID |
| Time Stamp |
| Position: Latitude, Longitude, accuracy, Elevation |
| Speed and Transmission state |
| Heading |
| Steering Angle |
| Acceleration and Yaw Rate |
| Brake Status |
| Vehicle length and width |
| ABS Active |
| Stability Control Active |
| Longitudinal Accelerometer |

| BSM Part II |
|---|
| Event flags |
| Path History |
| Path Prediction |
| Relative positioning RTCM |

FIG. 2

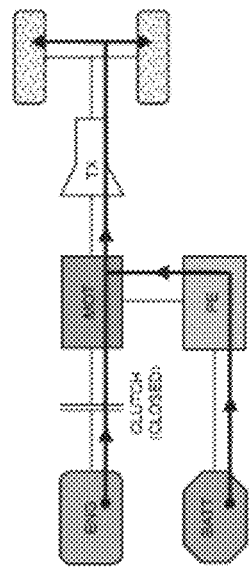
FIG. 8B: Hybrid/Electric Assist
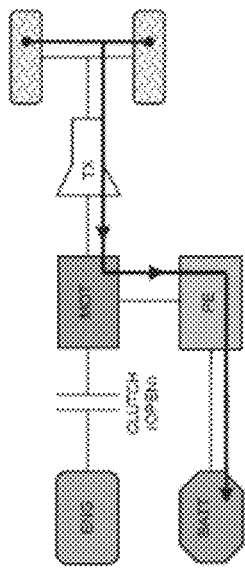
FIG. 8D: Regenerative Braking
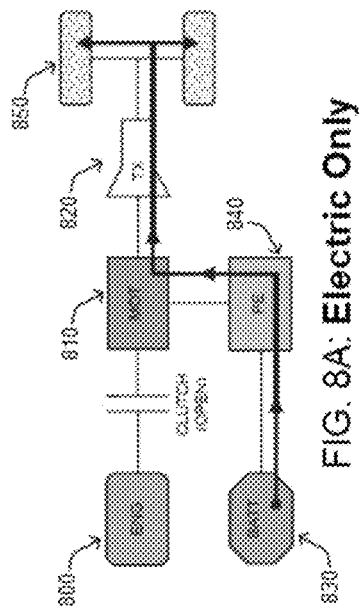
FIG. 8A: Electric Only
FIG. 8C: Battery Charging

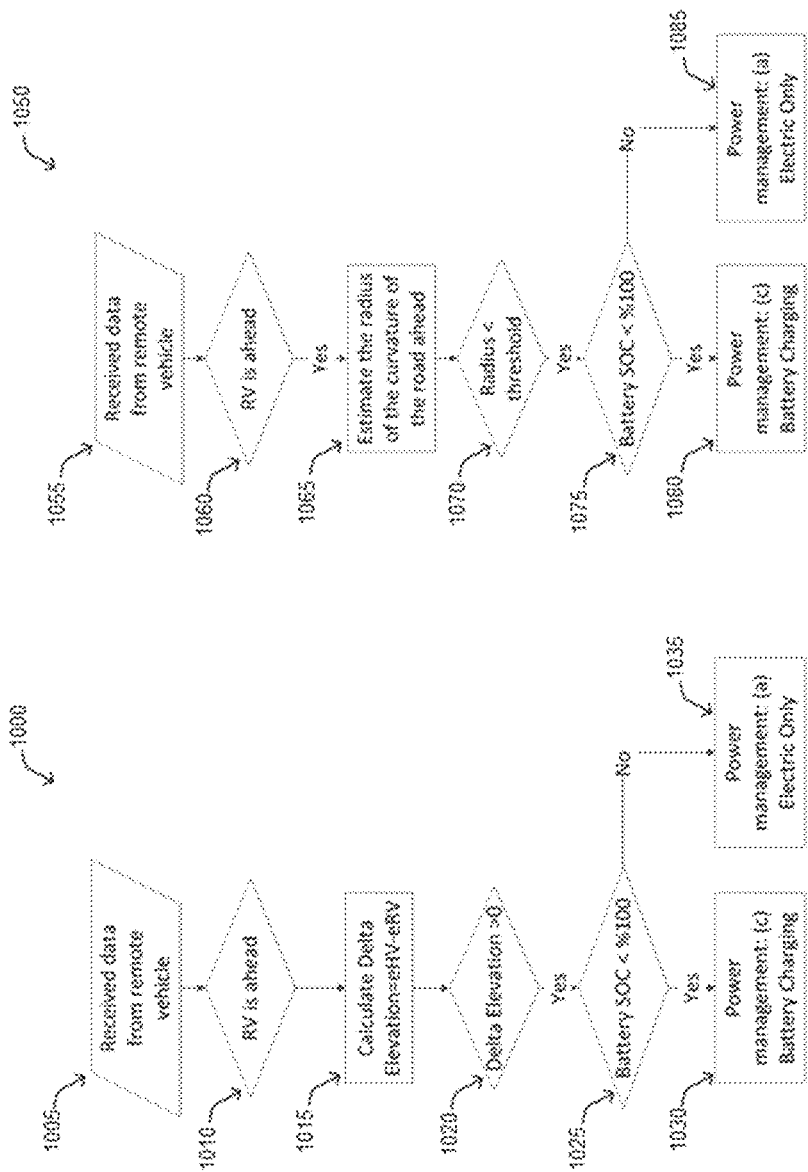

PREDICTIVE CONTROL OF POWERTRAIN SYSTEMS BASED ON VEHICLE-TO-VEHICLE (V2V) COMMUNICATIONS

BACKGROUND

(a) Technical Field

The present disclosure relates generally to automotive communication systems, and more particularly, to predictive control of powertrain systems based on Vehicle-to-Vehicle (V2V) communications.

(b) Background Art

For more than a decade, the United States Department of Transportation and National Highway Traffic Safety Administration have been conducting research on Vehicle-to-Vehicle (V2V) communications as a system for transmitting basic safety information between vehicles to facilitate warnings to drivers concerning impending crashes. V2V communications, or simply V2V, involves a dynamic wireless exchange of data between nearby vehicles offering the opportunity for significant safety improvements. V2V uses on-board dedicated short-range communication (DSRC) radio devices to transmit messages about a vehicle's speed, heading, brake status, and other information to other vehicles and receive the same messages from other vehicles.

These messages, known as Basic Safety Messages (BSMs), can be derived using non-vehicle-based technologies such as global positioning system (GPS) to detect a location and speed of a vehicle, or using vehicle-based sensor data where the location and speed data is derived from the vehicle's on-board computer. The vehicle-based sensor data can be combined with other data, such as latitude, longitude, and angle, to produce a richer, more detailed situational awareness of the position of other vehicles. Accordingly, exchanging messages with other vehicles using V2V enables a vehicle to automatically sense the position of surrounding vehicles with 360-degree awareness as well as the potential hazard they present, calculate risk based on the position, speed, or trajectory of surrounding vehicles, issue driver advisories or warnings, and take pre-emptive actions to avoid and mitigate crashes. Government agencies and automobile manufacturers, alike, are working toward widespread adoption of V2V, such that each vehicle on the roadway (e.g., cars, trucks, buses, motorcycles, etc.) is eventually able to communicate with other vehicles using V2V.

V2V technology opens the door to myriad benefits of an Intelligent Transportation System. In this regard, V2V data can be used to improve the overall driving performance of the vehicle itself. As an example, hybrid electric vehicles (HEVs) utilize a hybrid powertrain system with two or more power sources. Commonly, HEVs are driven using a combination of an internal combustion engine and a battery/electric drive system. The power sources may operate in parallel to simultaneously provide acceleration, or they may operate in series with a first source exclusively providing the acceleration and the second source being used to augment the first source's power reserve. Using the multiple power sources efficiently is crucial for optimal performance of the HEV. Thus, utilizing external information, such as V2V data, in addition to conventional hybrid powertrain control strategies, can allow for advanced control of the hybrid powertrain and greater operational efficiency thereof.

SUMMARY OF THE DISCLOSURE

The present disclosure provides techniques for utilizing V2V data from vehicles (i.e., remote vehicles) that are driving ahead of a subject vehicle (i.e., host vehicle) to provide advanced control strategies of a powertrain system of the host vehicle. In particular, the present disclosure is directed to advanced control of a hybrid powertrain system in which multiple power sources for driving the vehicle are utilized. The V2V data can be used by the host vehicle to selectively control operation of its multiple power sources based on features upcoming in the host vehicle's path, such as an elevation change, a curve, a traffic build-up, a lane change, and so forth. The V2V data received at the host vehicle can be paired with information about the host vehicle itself, such as a current speed, a throttle amount, a battery state of charge, and so forth, to control the hybrid powertrain of the host vehicle.

According to embodiments of the present disclosure, a method includes: receiving, at a host vehicle, Vehicle-to-Vehicle (V2V) messages transmitted using V2V communication from one or more remote vehicles; identifying at least one vehicle of the one or more remote vehicles that is ahead of the host vehicle based on information included in the received V2V messages; selecting V2V messages among the received V2V messages that were received from the at least one identified vehicle; and controlling a powertrain system of the host vehicle based on information included in the selected V2V messages.

The method may further include: predicting an upcoming driving condition based on the information included in the selected V2V messages; and controlling the powertrain system of the host vehicle based on the predicted upcoming driving condition. For instance, the upcoming driving condition may involve an acceleration event or a deceleration event, a change in elevation, a traffic flow event, or a road feature.

The identifying of the at least one vehicle of the one or more remote vehicles that is ahead of the host vehicle may include: determining remote vehicle travel information including one or more of: a past or current location of the one or more remote vehicles, a path history of the one or more remote vehicles, and a heading of the one or more remote vehicles; and identifying the at least one vehicle of the one or more remote vehicles that is ahead of the host vehicle based on the remote vehicle travel information. In this regard, the method may further include identifying the at least one vehicle by comparing the remote vehicle travel information to information about the host vehicle.

Along these lines, the method may further include identifying the at least one vehicle based further on information about the host vehicle. The information about the host vehicle may include one or more of: a location of the host vehicle, a heading of the host vehicle, an elevation of the host vehicle, a speed of the host vehicle, a throttle status of the host vehicle, and a battery state of charge (SOC) of the host vehicle.

Furthermore, the identifying of the at least one vehicle of the one or more remote vehicles that is ahead of the host vehicle may include: determining that a particular vehicle of the one or more remote vehicles is ahead of the host vehicle when the particular vehicle is: i) driving along a path that is substantially the same as a path along which the host vehicle is driving and ii) located ahead of the host vehicle with respect to a direction in which the host vehicle is driving.

To this end, the method may further include: determining a region in which a particular vehicle is driving; and determining that the particular vehicle is located ahead of the host vehicle when the region in which the particular vehicle is driving is a qualifying region among a plurality of regions. The method may further include: determining a lane in which a particular vehicle is driving; and determining that the particular vehicle is located ahead of the host vehicle when the particular vehicle is driving in the same lane as the host vehicle. The method may further include: determining a distance between a particular vehicle and the host vehicle; and determining that the particular vehicle is located ahead of the host vehicle when the distance is less than a predetermined threshold. The method may further include: determining a direction in which a particular vehicle is driving; and determining that the particular vehicle is driving along a path that is substantially the same as a path along which the host vehicle is driving when the particular vehicle is currently driving in substantially the same direction as the host vehicle. The method may further include: determining a direction in which a particular vehicle is driving; and determining that the particular vehicle is driving along a path that is substantially the same as a path along which the host vehicle is driving when the particular vehicle is currently driving in a different direction as the host vehicle but was previously driving in substantially the same direction as the host vehicle based on a path history of the particular vehicle.

Additionally, the method may further include: converting location coordinates of the host vehicle and location coordinates of the one or more remote vehicles into East-North-Up (ENU) coordinates before the identifying of the at least one vehicle.

The controlling of the powertrain system may include activating a hybrid power mode out of a plurality of hybrid power modes based on the information included in the selected V2V messages. The plurality of hybrid power modes may include two or more of: an electric-only mode, a hybrid/electric assist mode, a battery charging mode, and a regenerative braking mode. Moreover, the controlling of the powertrain system may include activating a hybrid power mode out of a plurality of hybrid power modes based on the information included in the V2V messages received from the at least one identified vehicle and on information about the host vehicle. The plurality of hybrid power modes may include two or more of: an electric-only mode, a hybrid/electric assist mode, a battery charging mode, and a regenerative braking mode, and the information about the host vehicle may include one or more of a location of the host vehicle, a heading of the host vehicle, an elevation of the host vehicle, a speed of the host vehicle, a throttle status of the host vehicle, and a battery SOC of the host vehicle. The powertrain system of the host vehicle may be a hybrid powertrain system.

The method may further include ignoring V2V messages received from the one or more remote vehicles other than the at least one identified vehicle.

Furthermore, according to embodiments of the present disclosure, a system includes: a Vehicle-to-Vehicle (V2V) communication unit of a host vehicle that is configured to receive V2V messages transmitted using V2V communication from one or more remote vehicles; and a controller of the host vehicle that is configured to: identify at least one vehicle of the one or more remote vehicles that is ahead of the host vehicle based on information included in the received V2V messages; select V2V messages among the received V2V messages that were received from the at least one identified vehicle; and control a powertrain system of the host vehicle based on information included in the selected V2V messages.

Furthermore, according to embodiments of the present disclosure, a non-transitory computer readable medium containing program instructions for performing a method includes: program instructions that receive, at a host vehicle, Vehicle-to-Vehicle (V2V) messages transmitted using V2V communication from one or more remote vehicles; program instructions that identify at least one vehicle of the one or more remote vehicles that is ahead of the host vehicle based on information included in the received V2V messages; program instructions that select V2V messages among the received V2V messages that were received from the at least one identified vehicle; and program instructions that control a powertrain system of the host vehicle based on information included in the selected V2V messages.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 2 illustrates a standard basic safety message (BSM) construction;

FIGS. 8A-8D illustrate example hybrid power modes available to an automotive hybrid powertrain system;

FIGS. 10A and 10B illustrate additional examples for selecting an optimal power mode to control a hybrid powertrain system.

Figure 1:
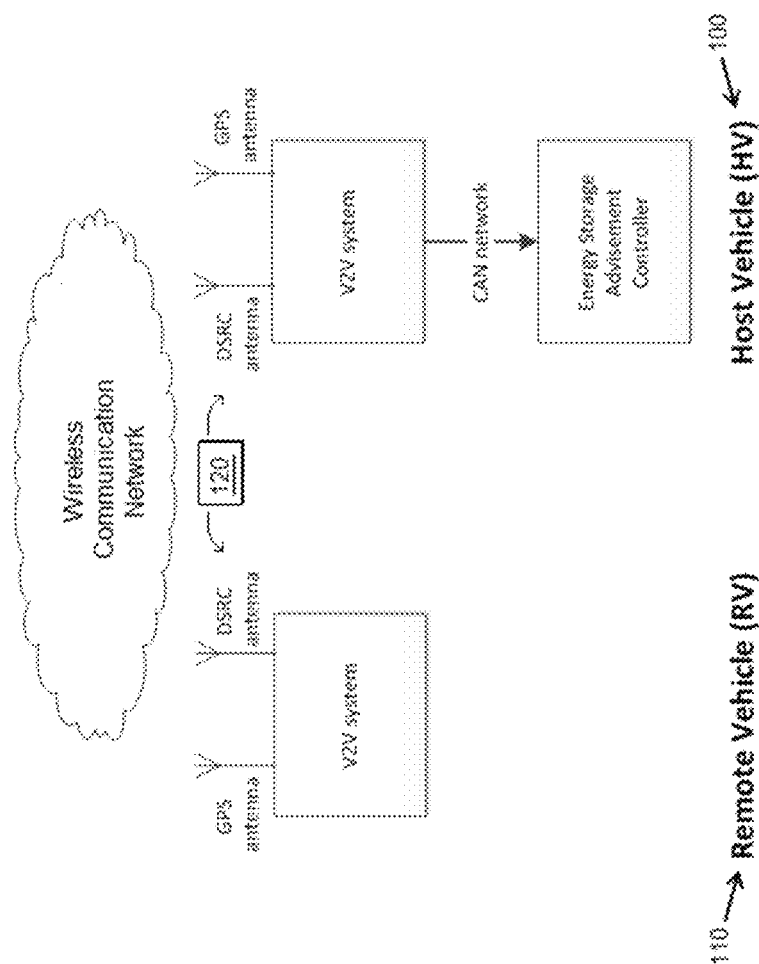
FIG. 1 illustrates an example architecture for V2V communication between a host vehicle and a remote vehicle.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Additionally, it is understood that one or more of the below methods, or aspects thereof, may be executed by at least one controller or controller area network (CAN) bus. The controller or controller area network (CAN) bus may be implemented in a vehicle, such as the host vehicle described herein. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the controller in conjunction with one or more additional components, as described in detail below.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

For the purposes of the present disclosure, "V2V messages," "V2V data," "V2V information," or the like, may refer to messages, or information, generally, transmitted and/or received using V2V communication techniques. For instance, V2V messages may refer to Basic Safety Messages (BSMs) and may include information about a vehicle's speed, heading, brake status, location, fuel efficiency, and so forth, as described in further detail with respect to FIG. 2.

Referring now to embodiments of the present disclosure, the disclosed techniques utilize a V2V communication network between a vehicle (i.e., "host vehicle") and at least one other vehicle (i.e., "remote vehicle"). Specifically, the host vehicle can communicate using V2V communication with at least one remote vehicle that is ahead of the host vehicle in order to receive information indicating characteristics of the road ahead. For instance, the V2V data received at the host vehicle from a remote vehicle that is driving ahead of the host vehicle may include information such as coordinates, elevation, brake status, etc. Based on this information, the host vehicle can determine characteristics of the road ahead and, as a result, intelligently control its powertrain system according to said characteristics. As an example, if a traffic jam is approaching, where frequent use of the brake is required, and the battery of the host vehicle is not fully charged, the host vehicle may activate a regenerative braking mode to charge its battery while braking. As another example, if a hill is approaching, in which additional throttle power is required, the host vehicle may activate a hybrid/electric assistance mode in which power is provided from both the engine (i.e., internal combustion engine) and the battery.

FIG. 1 illustrates an example architecture for V2V communication between a host vehicle and a remote vehicle. As shown in FIG. 1, a host vehicle (HV) 100 traveling on a roadway may be V2V communications-enabled, allowing the vehicle 100 to receive messages (e.g., BSMs) from other vehicles including various informational data (e.g., a vehicle's location, speed, heading, brake status, steering angle, vehicle size, path history, etc.) and transmit the same messages to other vehicles. As such, the host vehicle 100 may receive a plurality of messages 120 (e.g., BSMs) transmitted using V2V communications from a remote vehicle 110.

The standard BSM construction is illustrated in FIG. 2. The BSM is optimal for low latency, localized broadcast required by V2V safety applications. As such, BSMs are optimal for V2V communication and transmitted over dedicated short-range communication (DSRC) having a range of approximately 1,000 meters. The messages 120 may be signals sent from a dedicated short-range communication (DSRC) radio. In this regard, V2V-enabled vehicles can transmit V2V messages defined according to SAE J2735, which defines the structure of the data frame sent over-the-air. The physical layer for V2V transmissions is based on IEEE 802.11p, while the radio channel is defined by DSRC.

As shown in FIG. 2, the standard BSM (e.g., SAE J2735 BSM) consists of two parts: BSM Part I and BSM Part II. BSM Part I contains the core V2V data elements (e.g., vehicle size, position, speed, heading angle, acceleration, brake status, etc.). The BSM Part 1 is typically transmitted approximately 10 times per second. Meanwhile, BSM Part II contains a variable set of V2V data elements drawn from various optional data elements. BSM Part II can sometimes be added to Part I depending on recent events (e.g., anti-lock braking system activation, ambient temperature/air pressure, weather information, exterior lights status, etc.).

Referring again to FIG. 1, the host vehicle 100 and remote vehicle 110 may each be equipped with a DSRC antenna for transmitting and receiving V2V messages 120 over the air, thus forming a wireless communication network among the V2V-enabled vehicles. Additionally, the host vehicle 100 and remote vehicle 110 may each be equipped with global positioning system (GPS) antenna for receiving data from GPS satellites. The GPS data may be reflected in the transmitted V2V messages 120. That is, the GPS data received via the GPS antenna of a vehicle can be used to indicate the coordinates of the vehicle in a V2V message 120.

Practically, while only a single remote vehicle 110 is shown in FIG. 1, the host vehicle 100 may be proximate to multiple remote vehicles 110. Thus, the host vehicle 100 may receive multiple V2V messages 120 from the multiple remote vehicles 110. As an example, the host vehicle 100 may receive V2V messages 120 from remote vehicles 110 within an 800 meter radius of the host vehicle 100. The radius may vary according to the particular V2V communication equipment (e.g., DSRC antennas) installed in the host vehicle 100 and remote vehicles 110.

The host vehicle 100 may then select certain messages to keep and analyze, while ignoring other messages. In particular, the host vehicle 100 may keep V2V messages 120 received from one or more remote vehicles 110 determined to be ahead of the host vehicle 100. For instance, GPS data included in V2V messages 120 received at the host vehicle 100 can be used to determine whether a remote vehicle 110 is driving ahead of the host vehicle 100. Then, information in the V2V messages 120 received from the remote vehicles 110 determined to be ahead of the host vehicle 100 can be used to predict road or driving conditions ahead of the host vehicle 100. Based on the predicted conditions, a controller of the host vehicle 100 (e.g., energy storage advisement controller in FIG. 1) can control a hybrid powertrain system of the host vehicle, thereby increasing driving efficiency. As an example, propulsion resources in the hybrid powertrain system (e.g., battery charge, fuel, etc.) can be preserved in view of a detected event ahead of the host vehicle 100, where such resources would be needed.

Figure 3:
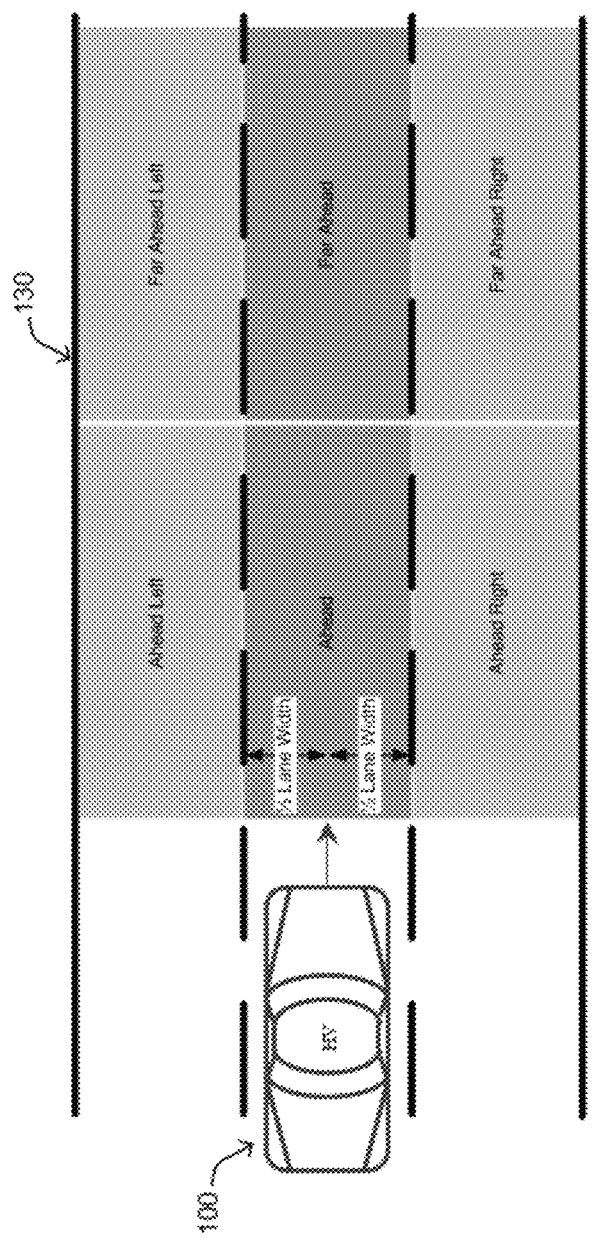
FIG. 3 illustrates an example map of predefined regions preceding the host vehicle.

FIG. 3 illustrates an example map of predefined regions preceding the host vehicle. As explained above, one or more remote vehicles 110 may be driving ahead of the host vehicle 100 on a road 130 on which the host vehicle 100 is driving. The host vehicle 100, or a controller of the host vehicle 100, more specifically, can determine a position of a remote vehicle 110 on the road 130 with respect to the host vehicle 100 based on information contained in V2V messages 120 received from the remote vehicle 110, such as coordinates of the remote vehicle 110 and path history of the remote vehicle 110. Furthermore, the host vehicle 100 can perform path prediction of the remote vehicle 110 based on the information contained in the received V2V messages 120.

Various methods for determining whether a remote vehicle 110 is driving ahead of the host vehicle 100, and thus whether V2V messages 120 received from said remote vehicle 110 are worth analyzing, exist. For instance, as shown in FIG. 3, the one or more remote vehicles 110 ahead of the host vehicle 100 may be positioned in one of multiple predefined regions on the road 130. The determination of whether a remote vehicle 110 is ahead of the host vehicle 100 may depend on whether the particular region in which the remote vehicle 110 is driving is a qualifying region.

In this regard, as shown in FIG. 3, regions on the road 130 preceding the host vehicle 100 may be predefined as, for example, a region closely ahead and in front of the host vehicle 100 (i.e., "ahead"), a region closely ahead and to the right of the host vehicle 100 (i.e., "ahead right"), a region closely ahead and to the region left of the host vehicle 100 (i.e., "ahead left"), a region distantly ahead and in front of the host vehicle 100 (i.e., "far ahead"), a region distantly ahead and to the left of the host vehicle 100 (i.e., "far ahead left"), and a region distantly ahead and to the right of the host vehicle 100 (i.e., "far ahead right").

Any of the predefined regions in a road 130 may be further defined as "qualifying" regions, whereby a remote vehicle 110 is determined to be driving ahead of the host vehicle 100 when the remote vehicle 110 is determined to be driving in one of the qualifying regions. In one example, referring to FIG. 3, qualifying regions among the multiple predefined regions could include only the region closely ahead and in front of the host vehicle 100 (i.e., "ahead") and the region distantly ahead and in front of the host vehicle 100 (i.e., "far ahead"). In another example, qualifying regions among the multiple predefined regions could include only the region closely ahead and in front of the host vehicle 100 (i.e., "ahead"), the region closely ahead and to the right of the host vehicle 100 (i.e., "ahead right"), and the region closely ahead and to the region left of the host vehicle 100 (i.e., "ahead left").

It should be understood that the predefined regions preceding the host vehicle 100 illustrated in FIG. 3 are shown for demonstration purposes only and do not limit the scope of the present claims. Instead, any suitable definition of regions preceding the host vehicle 100 on the road 130 may be defined. Similarly, any region among the predefined regions on the road 130 may be set as a qualifying region, based on the preference of the system designer. The processes for determining where remote vehicles 110 are driving with respect to the host vehicle 100 are described in detail hereinbelow.

Alternatively, regions on the road 130 may represent road lanes. For instance, the regions on the road 130 may represent the left lane, center lane, and right lane. In such case, a remote vehicle 110 may be determined to be driving ahead of the host vehicle 100 only when it is determined to be driving in the same lane as the host vehicle 100. Or, the remote vehicle 110 may be determined to be driving ahead of the host vehicle 100 only when it is determined to be driving in the same lane as the host vehicle 100 or in a lane adjacent to the lane of the host vehicle 100.

The host vehicle 100 may also use information contained in V2V messages 120 received from a remote vehicle 110 to determine whether the remote vehicle 110 is driving in substantially the same direction as the host vehicle 100. In one instance, V2V messages 120 received from a remote vehicle 110 which is found to be driving in a different direction than a direction in which the host vehicle 100 is driving may be ignored, whereas V2V messages 120 received from a remote vehicle 110 which is found to be driving in the same different direction as the host vehicle 100 may be kept and analyzed for the purposes of controlling the hybrid powertrain of the host vehicle 100. In another instance, the host vehicle 100 may analyze the received V2V messages 120 to determine that the remote vehicle 110 was previously driving in the same direction as the host vehicle 100, but is not currently driving in the same direction as the host vehicle 100, and therefore, it is possible that the remote vehicle 110 is driving on the same road as the host vehicle 100 and has turned along a curve in the road ahead of the host vehicle 100, as described in further detail below.

Figure 4:
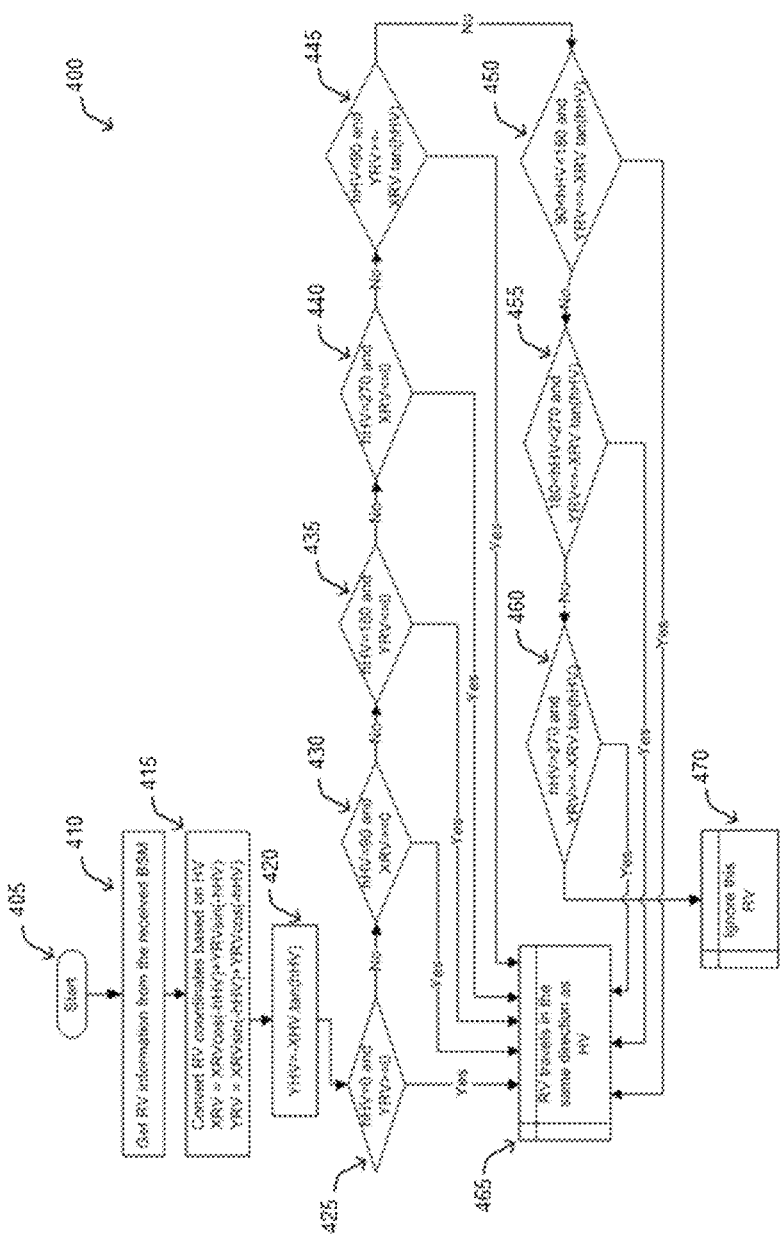
FIG. 4 illustrates an example simplified procedure for determining whether a remote vehicle is driving in the same direction as the host vehicle.

FIG. 4 illustrates an example simplified procedure for determining whether a remote vehicle is driving in the same direction as the host vehicle. The procedure 400 may start at step 405, and continue to step 410, where, as described in greater detail herein, the host vehicle 100 determines, based on information contained in V2V messages 120 received from a particular remote vehicle 110, as well as locally determined information about the position and heading of the host vehicle 100 itself, whether the particular remote vehicle is driving in substantially the same direction as the host vehicle 100. If the particular remote vehicle 110 is indeed determined to be driving in substantially the same direction as the host vehicle 100, the host vehicle 100 may use on the V2V messages 120 received from the particular remote vehicle 110 to determine upcoming features in the road 130, and may then control its own hybrid powertrain system in anticipation of the upcoming road features, thus enhancing efficiency of the system's operation. On the other hand, if the particular remote vehicle 110 is determined to be driving in a different direction, the host vehicle 100 may ignore any V2V messages 120 received from that remote vehicle 110. It should be understood that the procedure 400 as it is depicted in FIG. 4 is merely a single example for determining whether the remote vehicle 110 is driving in the same direction as the host vehicle 100, and the procedure 400 may be modified in a suitable manner, as would be understood by a person of ordinary skill in the art. The procedure 400 can be used to determine whether a remote vehicle 110 is driving along a path that is substantially the same as a path along which the host vehicle 100 is driving.

At step 410, the host vehicle 100 receives a V2V message 120 (i.e., a basic safety message (BSM)) from a remote vehicle 110, and therein, the host vehicle 100 receives information about the remote vehicle 110, including location, speed, heading, elevation, steering angle, brake status, and so on (i.e., remote vehicle travel information). Herein, XRV represents an x-coordinate of the remote vehicle 110, YRV represents a y-coordinate of the remote vehicle 110, XHV represents an x-coordinate of the host vehicle 100, YHV represents a y-coordinate of the host vehicle 100, and hHV represents a heading angle of the host vehicle 100. XRV and YRV are determined according to the received V2V message 120. Based on the collected information, the host vehicle 100 can determine whether or not the received V2V message 120 can be used to determine upcoming road/traffic features. In other words, the received V2V message 120 can be used to determine upcoming road/traffic features if calculations indicate that the remote vehicle 110 which send the V2V message is driving ahead of the host vehicle 100.

At step 415, coordinates of the remote vehicle 110, which were received in the V2V message (step 410), are converted based on the coordinates and heading of the host vehicle 100. In other words, the position and driving direction of the remote vehicle 110 is determined with respect to the host vehicle. First, XRV is converted according to the following formula: XRV cos(−hHV)+YRV sin(−hHV). Second, YRV is converted according to the following formula: XRV sin(−hHV)+YRV cos(−hHV). At step 420, YHV is converted according to the following formula: −XHV tan(hHV).

In steps 425 through 460, if one of various criteria is met, it can be determined at step 465 that the remote vehicle 110 is driving in substantially the same direction as the host vehicle 100. Conversely, if none of the various criteria is met, it can be determined at step 470 that the remote vehicle 110 is not driving in substantially the same direction as the host vehicle 100, and thus, the remote vehicle 110 can be ignored.

At step 425, if hHV equals zero and YRV is greater than or equal to zero, it is determined at step 465 that the remote vehicle 110 is driving in substantially the same direction as the host vehicle 100.

At step 430, if hHV equals 90 and XRV is greater than or equal to zero, it is determined at step 465 that the remote vehicle 110 is driving in substantially the same direction as the host vehicle 100.

At step 435, if hHV equals 180 and YRV is less than or equal to zero, it is determined at step 465 that the remote vehicle 110 is driving in substantially the same direction as the host vehicle 100.

At step 440, if hHV equals 270 and XRV is less than or equal to zero, it is determined at step 465 that the remote vehicle 110 is driving in substantially the same direction as the host vehicle 100.

At step 445, if hHV is less than 90 and YRV is greater than or equal to XRV tan(hHV), it is determined at step 465 that the remote vehicle 110 is driving in substantially the same direction as the host vehicle 100.

At step 450, if hHV is greater than 90 and less than 180 and YRV is less than or equal to −XRV tan(hHV), it is determined at step 465 that the remote vehicle 110 is driving in substantially the same direction as the host vehicle 100.

At step 455, if hHV is greater than 180 and less than 270 and YRV is less than or equal to −XRV tan(hHV), it is determined at step 465 that the remote vehicle 110 is driving in substantially the same direction as the host vehicle 100.

At step 460, if hHV is greater than 270 and YRV is greater than or equal to −XRV tan(hHV), it is determined at step 465 that the remote vehicle 110 is driving in substantially the same direction as the host vehicle 100.

At step 465, if any of the criteria in steps 425 through 460 is met, it can be determined that the remote vehicle 110 is driving in substantially the same direction as the host vehicle 100. In this case, it can be determined that the remote vehicle 110 is driving along a path that is substantially the same as a path along which the host vehicle 100 is driving because the remote vehicle 110 is currently driving in substantially the same direction as the host vehicle 100. Thus, the host vehicle 100 can use information contained in V2V messages 120 received from the remote vehicle 110 to determine road/traffic features ahead of the host vehicle 100. Then, the controller (i.e., energy storage controller) of the host vehicle 100 can efficiently control its hybrid powertrain system in view of the upcoming road/traffic features.

On the other hand, at step 470, if none of the criteria in steps 425 through 460 is met, it can be determined that the remote vehicle 110 is not driving in substantially the same direction as the host vehicle 100. Thus, the host vehicle 100 can ignore V2V messages 120 received from the remote vehicle 110.

The procedure 400 illustratively ends at step 465 or 470. The techniques by which the steps of procedure 400 may be performed, as well as ancillary procedures and parameters, are described in detail above.

It should be noted that the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Figure 5:
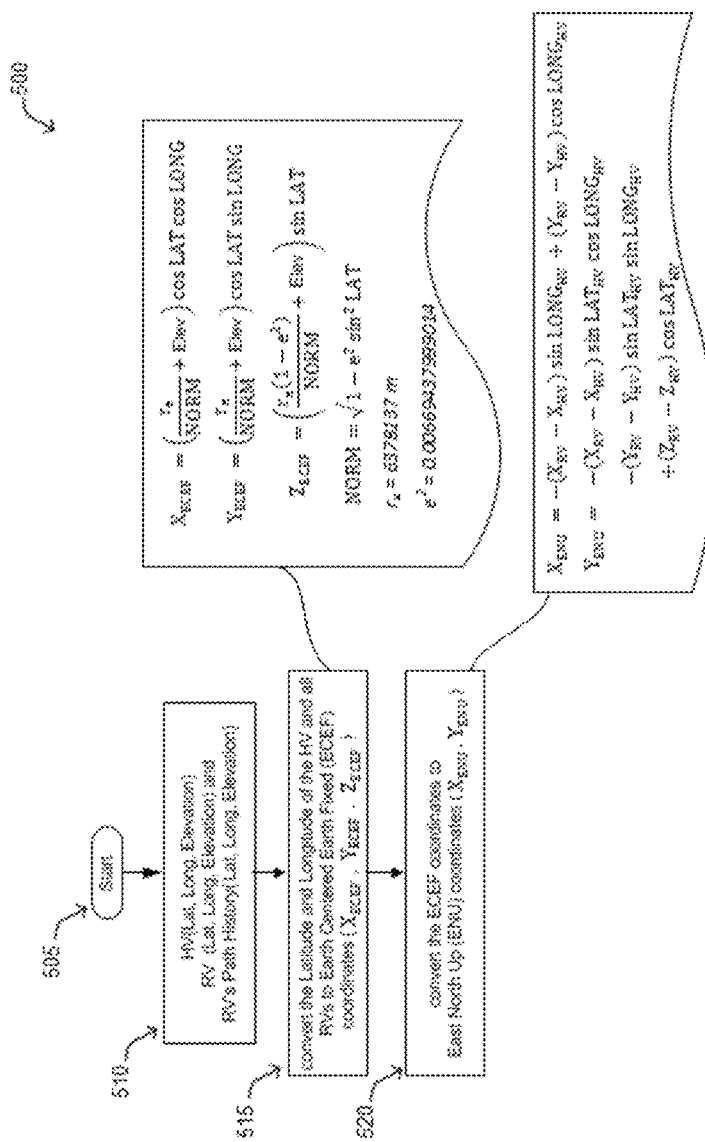
FIG. 5 illustrates an example simplified procedure for performing remote vehicle angle authentication.

While identifying one or more remote vehicles 110 driving ahead of the host vehicle 100, location coordinates of the host vehicle 100 and location coordinates of the one or more remote vehicles 110 may be converted into East-North-Up (ENU) coordinates. In this regard, FIG. 5 illustrates an example simplified procedure for performing remote vehicle angle authentication. The procedure 500 may start at step 505, and continue to step 510, where, as described in greater detail herein, coordinates of the host vehicle 100 and remote vehicles 110 can be converted into ENU coordinates to assist in the process of identifying vehicles traveling ahead of the host vehicle 100.

At step 510, initial information concerning the location of the host vehicle 100 and one or more remote vehicles 110 is collected. The information includes latitude ("Lat"), longitude ("Long"), and elevation ("Elev"). The information of the host vehicle 100 can be collected locally (e.g., using a GPS system installed in the host vehicle 100). The information of the remote vehicles 110 can be collected in V2V messages 120 transmitted from the remote vehicles 110 and received at the host vehicle 100. Furthermore, the path history of each remote vehicle 110 can be collected from the received V2V messages 120. In the V2V message 120, the BSM Part II typically includes path history information, as shown in FIG. 2. The path history can include the latitude, longitude, and elevation of each remote vehicle 110 at various points in time.

At step 515, the coordinates (i.e., latitude and longitude) of the host vehicle 100 and all remote vehicles 110 are converted to Earth Centered Earth Fixed (ECEF) coordinates ($X_{ECEF}$, $Y_{ECEF}$, $Z_{ECEF}$). In this regard, $X_{ECEF}$, $Y_{ECEF}$, and $Z_{ECEF}$ are calculated according to the following Equations:

$$X_{ECEF} = \left(\frac{r_e}{NORM} + Elev\right) \cos LAT \cos LONG \quad \text{[Equation 1]}$$

$$Y_{ECEF} = \left(\frac{r_e}{NORM} + Elev\right) \cos LAT \sin LONG \quad \text{[Equation 2]}$$

$$Z_{ECEF} = \left(\frac{r_e(1-e^2)}{NORM} + Elev\right) \sin LAT \quad \text{[Equation 3]}$$

$$NORM = \sqrt{1 - e^2 \sin^2 LAT} \quad \text{[Equation 4]}$$

Herein, $r_e$=6378137 m, and $e^2$=0.00669437999014.

At step 520, the ECEF coordinates calculated in step 515 are converted into East-North-Up (ENU) coordinates ($X_{ENU}$, $Y_{ENU}$). In this regard, $X_{ENU}$ and $Y_{ENU}$ are calculated according to the following Equations:

$$X_{ENU} = -(X_{RV} - X_{HV}) \sin LONG_{HV} + (Y_{RV} - Y_{HV}) \cos LONG_{HV} \quad \text{[Equation 5]}$$

$$Y_{ENU} = -(X_{RV} - X_{HV}) \sin LAT_{HV} \cos LONG_{HV} - (Y_{RV} - Y_{HV}) \sin LAT_{HV} \sin LONG_{HV} + (Z_{RV} - Z_{HV}) \cos LAT_{HV} \quad \text{[Equation 6]}$$

The procedure 500 illustratively ends at step 520. The techniques by which the steps of procedure 500 may be performed, as well as ancillary procedures and parameters, are described in detail above.

It should be noted that the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Figure 6:
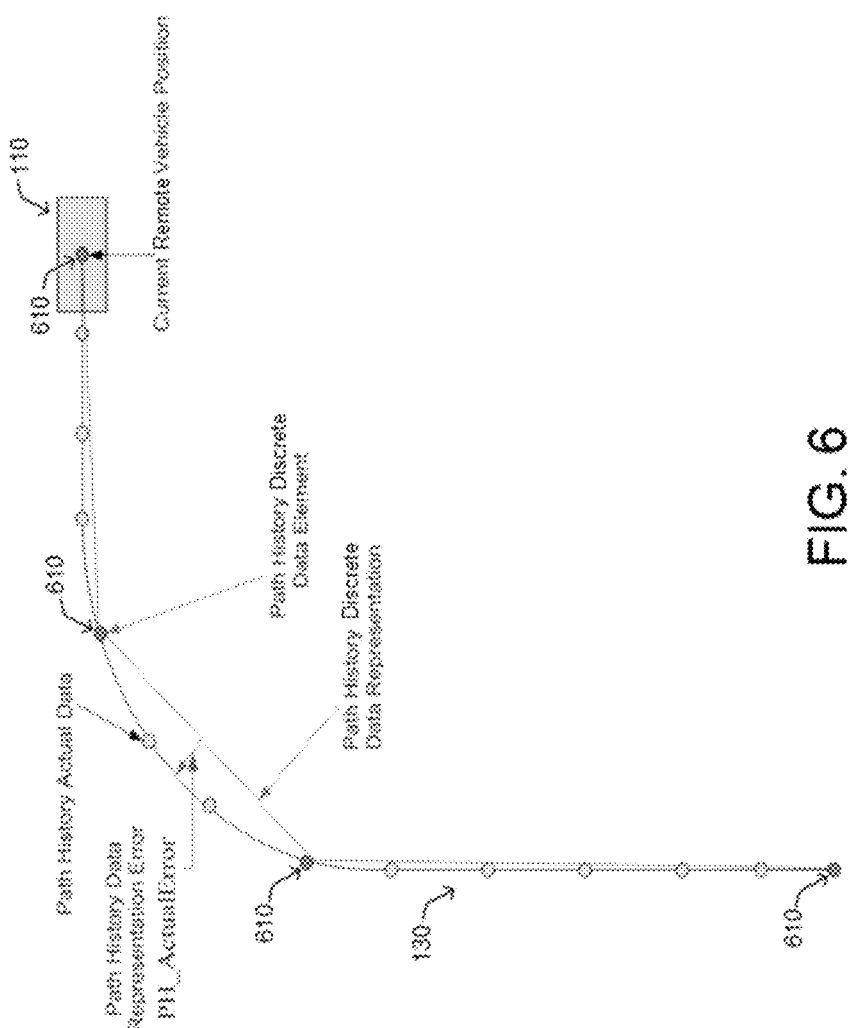
FIG. 6 illustrates an example set of path history data points.

As explained above, the V2V messages 120 received at the host vehicle 100 indicate the path history of a remote vehicle 110. The host vehicle 100 may then utilize the path history data, which consists of multiple data points, to determine whether the remote vehicles 110 are driving ahead of the host vehicle 100. In this regard, FIG. 6 illustrates an example set of path history data points. As shown in FIG. 6, a received V2V message 120 may include a plurality of path history data points 610 of the remote vehicle 110, indicating a path previously driven the remote vehicle 110.

The path history data points 610 represent discrete points along a path actually traveled by the remote vehicle 110. Because every point along the actual path is not represented, that is, the data points 610 represent only a subset of points along the actual path, a representation error may exist between a path formed by the path history data points 610 and the actual path. In other words, the path history discrete data representation may differ from the path history actual data, as shown in FIG. 6. This can occur particularly along a curve in the road 130. Thus, the controller of the host vehicle 100 can perform computations to compensate for the path history data representation error (i.e., PH_ActualError) when determining whether the remote vehicle 110 is driving ahead of the host vehicle 100 based on the path history data points 610 of the remote vehicle 110.

Figure 7:
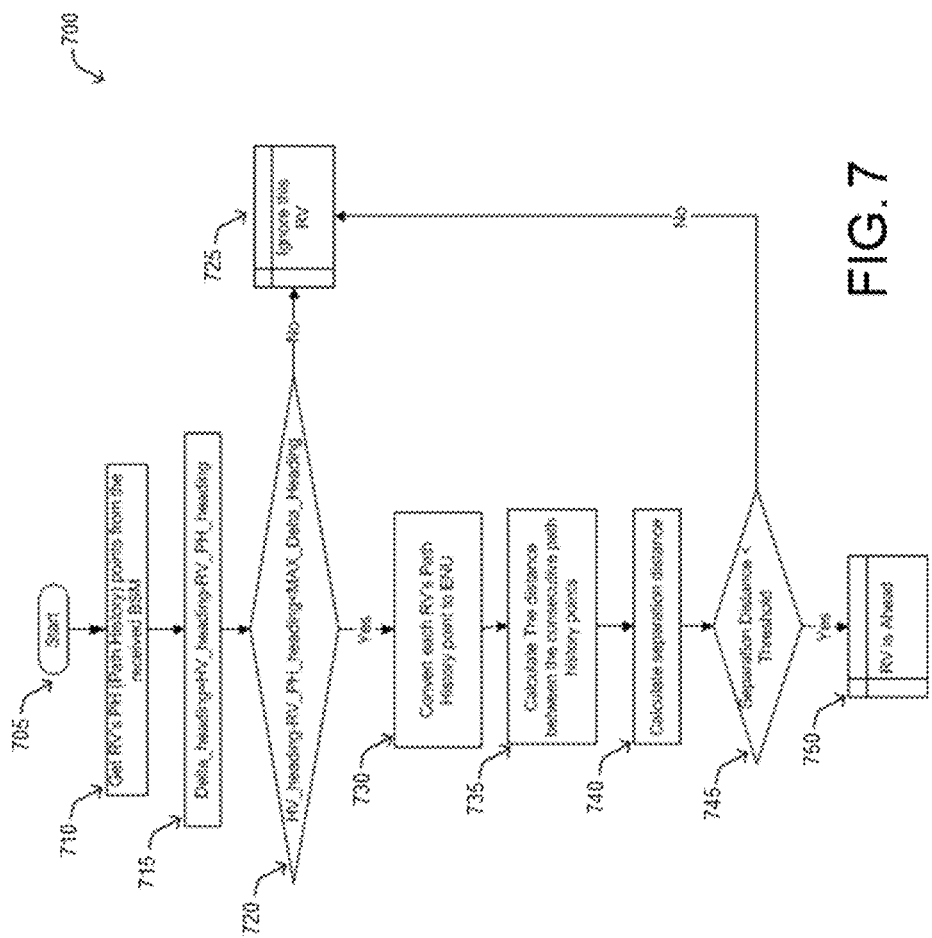
FIG. 7 illustrates an example simplified procedure for determining whether a remote vehicle is driving ahead of the host vehicle based on the path history of the remote vehicle.

To this end, FIG. 7 illustrates an example simplified procedure for determining whether a remote vehicle is driving ahead of the host vehicle based on the path history of the remote vehicle. The procedure 700 may start at step 705, and continue to step 710, where, as described in greater detail herein, the path history data points 610 can be utilized to estimate a separation distance between the host vehicle 100 and a remote vehicle 110 along a road 130. Further, the path history data points 610 can be utilized to estimate a difference between the heading of the host vehicle 100 and the heading of the remote vehicle 110 along the road 130. If the separation distance and the heading difference are less than respective predetermined thresholds, it can be determined that the remote vehicle 110 is driving ahead of the host vehicle 100, and V2V messages 120 from said remote vehicle 110 can be utilized to identify road/traffic features ahead of the host vehicle 100. The procedure 700 can be used to determine whether a remote vehicle 110 is driving along a path that is substantially the same as a path along which the host vehicle 100 is driving.

At step 710, a V2V message 120 is received from a remote vehicle 110 at the host vehicle 100. In the V2V message 120, the BSM Part II typically includes path history information, as shown in FIG. 2. Thus, a path history including multiple path history data points 610, as shown in FIG. 6, can be retrieved from the V2V message 120.

At step 715, a difference between the heading of the host vehicle 100 and the heading of the remote vehicle 110 based on the retrieved path history of the remote vehicle 110 can be calculated. Herein, HV_heading is the heading of the host vehicle 100, which may be determined locally at the host vehicle 100, RV_PH_heading is the heading of the remote vehicle 110 based on the path history of the remote vehicle 110, and Delta_heading is the difference between HV_heading and RV_PH_heading. Because the heading of the remote vehicle 110 is calculated based on its path history, RV_PH_heading does not represent its current heading, but rather its heading at a particular point in time. Moreover, the heading of the remote vehicle 110 may change over time according to the path history, particularly when the remote vehicle 110 drives along a curved road, as shown in FIG. 6. Thus, the Delta_heading may be calculated at various points in time, resulting in varying values depending on the heading of the remote vehicle 110 with respect to the host vehicle 100 at each point in time.

At step 720, it is determined whether the difference between the heading of the host vehicle 100 and the heading of the remote vehicle 110 based on the retrieved path history of the remote vehicle 110 is less than a maximum delta threshold. Herein, MAX_Delta_Heading is the maximum delta threshold. If the difference (i.e., Delta_heading) is less than the maximum threshold, the procedure 700 continues to step 730. If the difference is not less than the maximum threshold, however, it is determined that the remote vehicle 110 is not driving ahead of the host vehicle 100, and the remote vehicle 110 is ignored at step 725. Where multiple Delta_heading values exist, as explained above, each Delta_heading value can be compared to the maximum delta threshold. In this case, it can be determined that the remote vehicle 110 is driving along a path that is substantially the same as a path along which the host vehicle 100 is driving because the remote vehicle 110 was previously driving in substantially the same direction as the host vehicle 100, even though the remote vehicle 110 may not currently be driving in the same direction as the host vehicle 100, due to the curved road.

At step 730, each path history data point 610 in the path history of the remote vehicle 110 can be converted to East-North-Up (ENU) coordinates. The process for ENU conversion is described herein with respect to FIG. 5.

After conversion, at step 735, the distance between each path history data point 610 in the path history of the remote vehicle 110 can be calculated.

Then, at step 740, a separation distance between the host vehicle 100 and the remote vehicle 110 can be calculated. Because the separation distance between the host vehicle 100 and the remote vehicle 110 is calculated based on the path history of the remote vehicle 110, the separation distance may vary based on the point in time at which the separation distance is calculated. For instance, the respective driving speeds of the host vehicle 100 and the remote vehicle 110 may vary over time due to traffic or road features encountered by either vehicle, such as increased traffic, a curved road, a speed limit change, and so forth.

At step 745, it is determined whether the separation distance between the host vehicle 100 and the remote vehicle 110 is less than a predetermined threshold. Where multiple separation values exist, each separation value may be compared to the predetermined threshold. If the separation value is less than the predetermined threshold, it can be determined that the remote vehicle 110 is driving ahead of the host vehicle 100 at step 750 at step 750. Therefore, information in the V2V messages received from the remote vehicle 110 can be used to identify road/traffic features ahead of the host vehicle 100, and the host vehicle 100 can strategically control its hybrid powertrain system according to the identified features ahead. Conversely, if the separation value is not less than the predetermined threshold, it can be determined that the remote vehicle 110 is not driving ahead of the host vehicle 100, and any road/traffic features indicated by V2V messages received from said remote vehicle 110 would not be useful for the purposes of controlling the powertrain of the host vehicle 100. Therefore, the remote vehicle 110 can be ignored at step 725.

The procedure 700 illustratively ends at step 725 or 750. The techniques by which the steps of procedure 700 may be performed, as well as ancillary procedures and parameters, are described in detail above.

It should be noted that the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

As explained above, when a remote vehicle 110 driving ahead of the host vehicle 100 is identified, according to one or more of the above procedures, V2V messages received from the remote vehicle 110 can be utilized by the host vehicle 100 to identify upcoming road/traffic features. With such information, the host vehicle 100 can strategically control its powertrain system to enhance the system's efficiency.

With respect to hybrid electric vehicle (HEVs), in particular, using the multiple power sources efficiently is crucial for optimal performance of the vehicle. As is generally known in the art, HEVs utilize a hybrid powertrain system with two or more power sources. HEVs are commonly driven using a combination of an internal combustion engine and a battery/electric drive system. In this regard, there are multiple possible power modes for operating the hybrid powertrain system. Each power mode is unique according to the active power source, i.e., the engine, the battery, or both, whether the battery is being charged, and if so, the manner in which the battery is being charged.

FIGS. 8A-8D illustrate example hybrid power modes available to an automotive hybrid powertrain system. It should be understood that the hybrid powertrain system depicted in FIGS. 8A-8D is a simplified system for demonstration purposes only and should not be treated as limiting the scope of the present claims.

The illustrative hybrid powertrain couples an internal combustion engine and a battery/electric drive system as power sources. In the hybrid powertrain, known as a parallel hybrid powertrain system, the power sources can be operated in parallel with one another. As shown in FIGS. 8A-8D, the engine 800 ("ENG") is an internal combustion engine and is coupled to an electric motor 810 ("MOT"). The internal combustion engine 800 may act as the main source of vehicle power, while the electric motor 810 assists the engine 800 during acceleration in some cases. A clutch can be manipulated to control when the motor 810 receives power from the engine 800. A battery 830 ("BATT") stores charge can provide electricity via a power electronics module 840 ("PE") to the motor 810. The engine 800 may be operable to charge the battery 830, which may include a bank of batteries. The power electronics module 840 includes a controller to control the output of electricity from the battery 830 to the motor 810 and to control the charging of the battery 830. The electric motor 810 may run entirely fed by electricity from the battery 830, or via a generator (not shown) turned by the internal combustion engine 800, or both. The motor 810 may include the generator in some cases. The motor 810 then provides power to a transmission 820 ("TX") which turns the wheels 850 and thereby drives the hybrid vehicle.

As shown in FIG. 8A, the hybrid powertrain may operate in an "electric only" mode. In this mode, the vehicle is driven using only electricity from the battery 830, which is provided to the motor 810. The engine 800 may not provide power to the motor 810 since the clutch installed between the engine 800 and motor 810 is open. The engine 800 may be operating in an idle manner or may be turned off completely. Thus, the vehicle is driven using electric power only.

As shown in FIG. 8B, the hybrid powertrain may operate in a "hybrid/electric assist" mode. In this mode, the engine 800 and electric motor 810 are operated in parallel with one another. That is, the vehicle is driven using a combination of power generated by the engine 800 and electric power deriving from the battery 830. Here, the electric motor 810 is fed electrical energy from the battery 830 and mechanical energy from the internal combustion engine 800 converted by a generator. This mode can be beneficial where electric power by itself is insufficient or would be inefficient to use on its own, e.g., when driving up hill, when merging, etc.

As shown in in FIG. 8C, the hybrid powertrain may operate in a "battery charging" mode. In this mode, the electric motor 810 can act as a generator to recharge the battery 830 through the internal combustion engine 800. For instance, the engine 800 can run while the hybrid vehicle is stopped to charge the battery 830. This mode can be beneficial when the state of charge (SOC) of the battery 830 is low.

As shown in FIG. 8D, the hybrid powertrain may operate in a "regenerative braking" mode. In this mode, the electric motor can, again, act as a generator; but rather than converting energy generated by the engine 800, as in FIG. 8C, kinetic energy is extracted from the braking of the wheels 850 and converted to electrical energy for the purposes of charging the battery 830. The transfer of energy to the battery 830 therefore provides the braking effect, improving the overall efficiency of the vehicle, as well as extending the life of the braking system.

It should be understood that additional power modes for a hybrid powertrain system exist beyond those illustrated in FIGS. 8A-8D. Thus, the power modes shown for FIGS. 8A-8D should not be construed as limiting the control strategies of the hybrid powertrain system.

Figure 9:
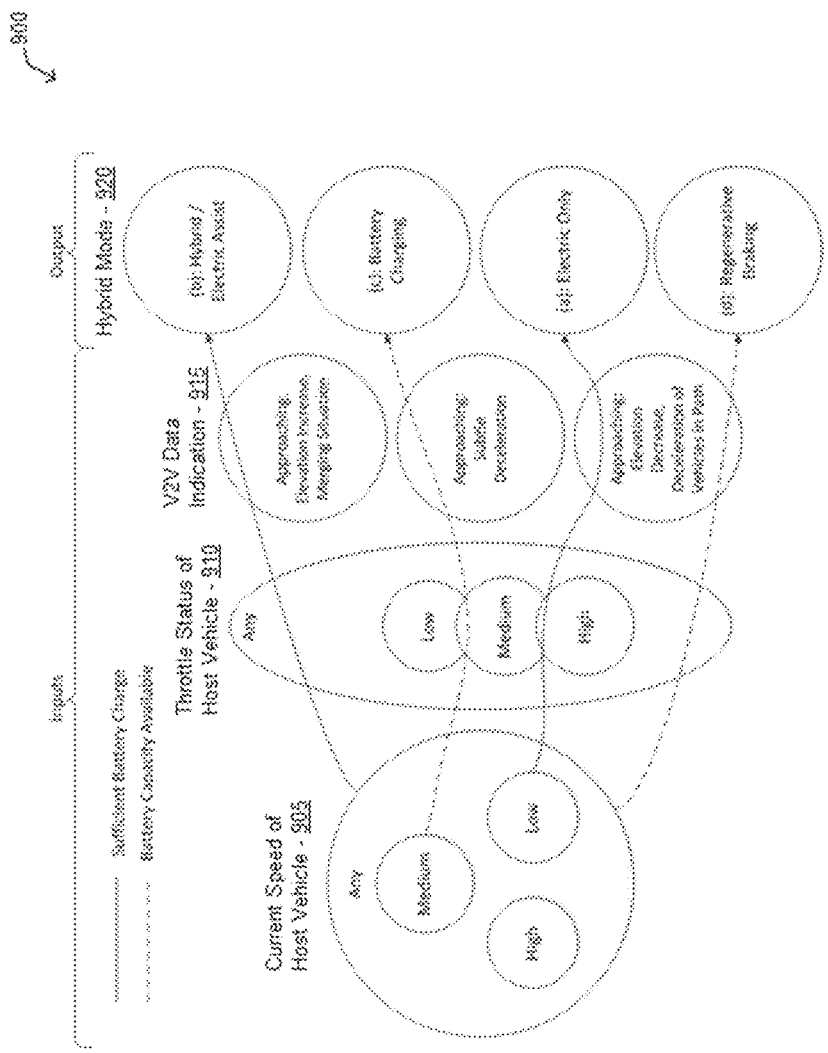
FIG. 9 illustrates an example simplified process flow for selecting an optimal power mode among a plurality of hybrid power modes.

FIG. 9 illustrates an example simplified process flow for selecting an optimal power mode among a plurality of hybrid power modes, such as those shown in FIGS. 8A-8D. The process flow 900 may start at step 905, and continue to step 910, where, as described in greater detail herein, the optimal hybrid power mode for a hybrid vehicle may be selected based on host vehicle data collected locally at the host vehicle 100 and remote vehicle data collected via V2V messages 120 received at the host vehicle 100 from one or more remote vehicles 110 determined to be driving ahead of the host vehicle 100. A controller of the host vehicle 100 (i.e., energy storage advisement controller) can use upcoming road/traffic characteristics identified from the received V2V messages 120 as well as information about the host vehicle 100 itself (inputs), and then select and activate an optimal hybrid power mode (output) based on the identified characteristics, according to the process flow 900 depicted in FIG. 9. As an example, the controller may activate the selected power mode by engaging actuators corresponding to the selected mode. It should be noted that in FIG. 9, a solid line represents a battery state in which there is sufficient battery charge, while a dashed line represents that there is battery capacity available (i.e., the battery 830 can be recharged).

In step 905, the controller determines a current speed of the host vehicle 100. For instance, the current speed of the host vehicle 100 may be categorized in one of multiple speed statuses. Speed ranges corresponding to each speed status may be predefined in any suitable manner Illustratively, the predefined speed statuses may include low (e.g., city driving or driving in heavy traffic), medium (e.g., regular driving), and high (e.g., highway driving). For instance, low speed could correspond to 0 mph to 20 mph, medium speed could correspond to 21 mph to 45 mph, and high speed could correspond to 46 mph or more. In some cases, the controller may select the power mode in step 920 regardless of the current speed status of the host vehicle 100. That is, depending on the V2V data identified in step 915, the power mode selected in step 920 may be appropriate for the host vehicle 100 regardless of its current speed.

In step 910, the controller determines the current throttle status of the host vehicle 100. For instance, the throttle amount of the host vehicle 100 may be categorized in one of multiple throttle statuses. Ranges corresponding to each throttle status may be predefined. Illustratively, the predefined throttle statuses may include low, medium, and high. For instance, each throttle status could correspond to an opening amount of the throttle valve of the vehicle. In some cases, the controller may select the power mode in step 920 regardless of the throttle status of the host vehicle 100. That is, depending on the V2V data identified in step 915, the power mode selected in step 920 may be appropriate for the host vehicle 100 regardless of its throttle status.

In step 915, the controller identifies road/traffic features the host vehicle 100 is approaching based on V2V messages 120 received at the host vehicle 100 from one or more remote vehicles 110 determined to be driving ahead of the host vehicle 100. The upcoming road/traffic features may include any variety of features which could affect the driving of the vehicle, such as an acceleration event, deceleration event, change in elevation, traffic flow event, road feature, and the like. Illustratively, the road/traffic features may include an elevation increase (e.g., driving up a hill, etc.), an elevation decrease (e.g., driving down a hill, etc.), a merging situation (e.g., driving onto a highway, changing lanes, etc.), a subtle deceleration (e.g., a curved road requiring deceleration, a nearby traffic accident, etc.), a deceleration of vehicles in path (e.g., a traffic jam, etc.), and so forth. In some cases, a certain road/traffic feature, such as a deceleration event, could result in the selection of differing hybrid power modes in step 920 depending on the current speed (step 905) and/or throttle status (step 910) of the vehicle, and depending further on whether the battery 830 is fully charged or needs re-charging.

In step 920, the controller analyzes the inputs at steps 905, 910 and 915 and selects an optimal power mode among multiple predefined hybrid power modes for operating the hybrid powertrain system of the host vehicle 100. The available hybrid power modes may be those depicted in FIGS. 8A-8D, though the available hybrid power modes are not limited to such, as explained above.

FIG. 9 provides several examples for selecting the optimal hybrid power mode based on the inputs at steps 905, 910 and 915. In a first example, the battery 830 of the host vehicle 100 has sufficient charge, and the host vehicle 100 is approaching either an elevation increase or a merging situation according to V2V data. Here, the hybrid/electric assist mode, where the engine 800 and electric motor 810 are operated in parallel, can be optimally selected for operation of the hybrid powertrain in step 920, regardless of the current speed or throttle amount of the host vehicle 100. In a second example, the host vehicle 100 has battery capacity available, is currently driving at a medium speed with a low or medium amount of throttle, and is approaching a subtle deceleration event according to V2V data. Here, the battery charging mode, where the electric motor 810 can act as a generator to recharge the battery 830 through the internal combustion engine 800, can be optimally selected for operation of the hybrid powertrain in step 920. In a third example, the battery 830 of the host vehicle 100 has sufficient charge, the host vehicle 100 is currently driving at a low speed with a medium or high amount of throttle, and is approaching either an elevation decrease or a deceleration of vehicles in its path according to V2V data. Here, the electric only mode, where the vehicle is driven using only electricity from the battery 830, can be optimally selected for operation of the hybrid powertrain in step 920. In a fourth example, the host vehicle 100 has battery capacity available and is approaching either an elevation decrease or a deceleration of vehicles in its path according to V2V data. Here, the regenerative braking mode, where kinetic energy is extracted from the braking of the wheels 850 and converted to electrical energy for the purposes of charging the battery 830, can be optimally selected for operation of the hybrid powertrain in step 920, regardless of the current speed or throttle amount of the host vehicle 100. It should be understood that these examples are merely for the purposes of demonstrating the disclosed embodiments and should not be treated as limiting the scope of the present claims.

The flow process 900 illustratively ends at step 920, where the operation mode for the hybrid powertrain system of the host vehicle 100 is selected. The techniques by which the steps of flow process 900 may be performed, as well as ancillary procedures and parameters, are described in detail above.

It should be noted that the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

FIGS. 10A and 10B illustrate additional examples for selecting an optimal power mode to control a hybrid powertrain system. The procedures 1000 and 1050 may start at steps 1005 and 1055 and continue to steps 1010 and 1060, respectively, where, as described in greater detail herein, the optimal hybrid power mode for a hybrid vehicle may be selected based on host vehicle data collected locally at the host vehicle 100 and remote vehicle data collected via V2V messages 120 received at the host vehicle 100 from one or more remote vehicles 110 determined to be driving ahead of the host vehicle 100.

In FIG. 10A, an optimal hybrid power mode is selected based on an elevation difference between the host vehicle 100 and a remote vehicle 110. At step 1005, V2V messages 120 are received at the host vehicle 100 from a remote vehicle 110, as explained above at least with respect to FIG. 1. At step 1010, it is determined whether the remote vehicle 110 is driving ahead of the host vehicle 100, as explained above at least with respect to FIGS. 3-7.

At step 1015, a difference in elevation (i.e., delta elevation) between the host vehicle 100 (eHV) and the remote vehicle 110 (eRV) is calculated according to the formula: eHV−eRV. The elevation of the host vehicle 100 can be determined locally (e.g., using a GPS system), and the elevation of the remote vehicle 110 can be determined by the host vehicle 100 based on the V2V messages 120 received from the remote vehicle 110.

At step 1020, it is determined whether the difference in elevation (i.e., delta elevation) is greater than zero. In other words, it is determined whether the elevation of the host vehicle 100 is greater than the elevation of the remote vehicle 110. In a case where the elevation of the host vehicle 100 is, in fact, greater than the elevation of the remote vehicle 110, it can be determined that the host vehicle 100 is approaching a negative change in elevation (e.g., a downhill). If the delta elevation is greater than zero, the procedure 1000 continues to step 1025.

If, at step 1025, it is determined that the SOC of the battery 830 is less than 100%, the controller of the host vehicle 100 can select the battery charging mode, where the electric motor 810 acts as a generator to recharge the battery 830 through the internal combustion engine 800, to optimally operate the hybrid powertrain system in step 1030. If, on the other hand, it is determined that the SOC of the battery 830 is fully charged (i.e., the SOC is 100%), the controller of the host vehicle 100 can select the electric only mode, where the vehicle is driven using only electricity from the battery 830, to optimally operate the hybrid powertrain system in step 1035.

In FIG. 10B, an optimal hybrid power mode is selected based on a curvature of a road ahead of the host vehicle 100. At step 1055, V2V messages 120 are received at the host vehicle 100 from a remote vehicle 110, as explained above at least with respect to FIG. 1. At step 1060, it is determined whether the remote vehicle 110 is driving ahead of the host vehicle 100, as explained above at least with respect to FIGS. 3-7.

At step 1065, the radius of the curvature of a road ahead of the host vehicle 100 is estimated. The curvature of the road ahead of the host vehicle 100 can be estimated based on, for example, path history data of the remote vehicle 110 contained in V2V messages 120 received from the remote vehicle 110.

At step 1070, it is determined whether the estimated radius is less than a predetermined threshold. In other words, the sharpness of the road curvature is determined, where a curved road section with a small radius represents a sharper curve than a curved road section with a larger radius. Notably, a curved road section with a small radius requires a lower driving speed than a curved road section with a larger radius. If the estimated radius is less than the predetermined threshold, the procedure 1050 continues to step 1075.

If, at step 1075, it is determined that the SOC of the battery 830 is less than 100%, the controller of the host vehicle 100 can select the battery charging mode, where the electric motor 810 acts as a generator to recharge the battery 830 through the internal combustion engine 800, to optimally operate the hybrid powertrain system in step 1080. If, on the other hand, it is determined that the SOC of the battery 830 is fully charged (i.e., the SOC is 100%), the controller of the host vehicle 100 can select the electric only mode, where the vehicle is driven using only electricity from the battery 830, to optimally operate the hybrid powertrain system in step 1085.

The procedures 1000 and 1050 illustratively end at steps 1030/1035 and 1080/1085, respectively. The techniques by which the steps of procedures 1000 and 1050 may be performed, as well as ancillary procedures and parameters, are described in detail above.

It should be noted that the steps shown in FIGS. 10A and 10B are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Accordingly, techniques are described herein that allow for optimal control of a powertrain system based on road/traffic features ahead of a host vehicle. The road/traffic features can be determined based on messages received at the host vehicle via V2V communication from remote vehicles which are determined to be driving ahead of the host vehicle. Thus, V2V data from remote vehicles preceding the host vehicle can be used to efficiently operate the powertrain system of the host vehicle.

Advantageously, the predictive V2V-based powertrain control system described herein manages the powertrain system during peak load situations and produces increased fuel economy by allowing for the usage of smaller, less expensive, and more fuel efficient internal combustion engines that contribute less exhaust emissions. Further, the predictive V2V-based powertrain control system described herein can modify traditional engine tuning parameters in real-time based upon the V2V data that is transmitted to the host vehicle.

While there have been shown and described illustrative embodiments that provide for controlling hybrid powertrain systems based on V2V communications, it is to be understood that various other adaptations and modifications may be made within the spirit and scope of the embodiments herein. For instance, while vehicles with hybrid powertrain systems are frequently referenced throughout the present disclosure, the V2V data may also be used in vehicles with a traditional multi-gear transmission to allow for predictive gear selection or in internal combustion engine vehicles to allow for predictive cylinder activation/deactivation. Therefore, the embodiments of the present disclosure may be modified in a suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a host vehicle, Vehicle-to-Vehicle (V2V) messages transmitted using V2V communication from one or more remote vehicles;
   identifying at least one vehicle of the one or more remote vehicles that is ahead of the host vehicle based on information included in the received V2V messages;
   selecting V2V messages among the received V2V messages that were received from the at least one identified vehicle; and
   controlling a powertrain system of the host vehicle based on information included in the selected V2V messages, wherein the controlling of the powertrain system comprises activating a hybrid power mode among a plurality of hybrid power modes based on the information included in the selected V2V messages.

2. The method of claim 1, further comprising:
   predicting an upcoming driving condition based on the information included in the selected V2V messages; and
   controlling the powertrain system of the host vehicle based on the predicted upcoming driving condition.

3. The method of claim 2, wherein the upcoming driving condition involves an acceleration event or a deceleration event.

4. The method of claim 2, wherein the upcoming driving condition involves a change in elevation.

5. The method of claim 2, wherein the upcoming driving condition involves a traffic flow event.

6. The method of claim 2, wherein the upcoming driving condition involves a road feature.

7. The method of claim 1, wherein the identifying of the at least one vehicle of the one or more remote vehicles that is ahead of the host vehicle comprises:
   determining remote vehicle travel information including one or more of: a past or current location of the one or more remote vehicles, a path history of the one or more remote vehicles, and a heading of the one or more remote vehicles; and
   identifying the at least one vehicle of the one or more remote vehicles that is travelling ahead of the host vehicle based on the remote vehicle travel information.

8. The method of claim 7, further comprising:
   identifying the at least one vehicle by comparing the remote vehicle travel information to information about the host vehicle.

9. The method of claim 1, further comprising:
   identifying the at least one vehicle based further on information about the host vehicle.

10. The method of claim 9, wherein the information about the host vehicle includes one or more of: a location of the host vehicle, a heading of the host vehicle, an elevation of the host vehicle, a speed of the host vehicle, a throttle status of the host vehicle, and a battery state of charge (SOC) of the host vehicle.

11. The method of claim 1, wherein the identifying of the at least one vehicle of the one or more remote vehicles that is ahead of the host vehicle comprises:
   determining that a particular vehicle of the one or more remote vehicles is ahead of the host vehicle when the particular vehicle is: i) located ahead of the host vehicle with respect to a direction in which the host vehicle is driving and ii) driving along a path that is substantially the same as a path along which the host vehicle is driving.

12. The method of claim 1, further comprising:
   determining a region in which a particular vehicle is driving; and
   determining that the particular vehicle is located ahead of the host when the region in which the particular vehicle is driving is a qualifying region among a plurality of predefined regions.

13. The method of claim 1, further comprising:
   determining a lane in which a particular vehicle is driving; and
   determining that the particular vehicle is located ahead of the host vehicle when the particular vehicle is driving in the same lane as the host vehicle.

14. The method of claim 1, further comprising:
   determining a distance between a particular vehicle and the host vehicle; and
   determining that the particular vehicle is located ahead of the host vehicle when the distance is less than a predetermined threshold.

15. The method of claim 1, further comprising:
   determining a direction in which a particular vehicle is driving; and
   determining that the particular vehicle is driving along a path that is substantially the same as a path along which the host vehicle is driving when the particular vehicle is currently driving in substantially the same direction as the host vehicle.

16. The method of claim 1, further comprising:
determining a direction in which a particular vehicle is driving; and
determining that the particular vehicle is driving along the path that is substantially the same as a path along which the host vehicle is driving when the particular vehicle is currently driving in a different direction as the host vehicle but was previously driving in substantially the same direction as the host vehicle based on a path history of the particular vehicle.

17. The method of claim 1, further comprising:
converting location coordinates of the host vehicle and location coordinates of the one or more remote vehicles into East-North-Up (ENU) coordinates before the identifying of the at least one vehicle.

18. The method of claim 1, wherein the plurality of hybrid power modes include two or more of: an electric-only mode, a hybrid/electric assist mode, a battery charging mode, and a regenerative braking mode.

19. The method of claim 1, wherein the controlling of the powertrain system comprises:
activating a hybrid power mode out of a plurality of hybrid power modes based on the information included in the V2V messages received from the at least one identified vehicle and on information about the host vehicle.

20. The method of claim 19, wherein:
the plurality of hybrid power modes include two or more of: an electric-only mode, a hybrid/electric assist mode, a battery charging mode, and a regenerative braking mode, and
the information about the host vehicle includes one or more of a location of the host vehicle, a heading of the host vehicle, an elevation of the host vehicle, a speed of the host vehicle, a throttle status of the host vehicle, and a battery SOC of the host vehicle.

21. The method of claim 1, wherein the powertrain system of the host vehicle is a hybrid powertrain system.

22. The method of claim 1, further comprising:
ignoring V2V messages received from the one or more remote vehicles other than the at least one identified vehicle.

23. A system comprising:
a Vehicle-to-Vehicle (V2V) communication unit of a host vehicle that is configured to receive V2V messages transmitted using V2V communication from one or more remote vehicles; and
a controller of the host vehicle that is configured to:
identify at least one vehicle of the one or more remote vehicles that is ahead of the host vehicle based on information included in the received V2V messages;
select V2V messages among the received V2V messages that were received from the at least one identified vehicle;
control a powertrain system of the host vehicle based on information included in the selected V2V messages; and
activate a hybrid power mode among a plurality of hybrid power modes based on the information included in the selected V2V messages.

24. A non-transitory computer readable medium containing program instructions for performing a method, the computer readable medium comprising:
program instructions that receive, at a host vehicle, Vehicle-to-Vehicle (V2V) messages transmitted using V2V communication from one or more remote vehicles;
program instructions that identify at least one vehicle of the one or more remote vehicles that is ahead of the host vehicle based on information included in the received V2V messages;
program instructions that select V2V messages among the received V2V messages that were received from the at least one identified vehicle;
program instructions that control a powertrain system of the host vehicle based on information included in the selected V2V messages; and
program instructions that activate a hybrid power mode among a plurality of hybrid power modes based on the information included in the selected V2V messages.

* * * * *